UNITED STATES PATENT OFFICE.

JOHN JOHNSON, OF BROOKLYN, NEW YORK, ASSIGNOR OF ONE-HALF HIS RIGHT TO JAMES H. GILBERT, OF SAME PLACE.

IMPROVEMENT IN COMPOUNDS FOR STEAM-PACKING.

Specification forming part of Letters Patent No. 199,833, dated January 29, 1878; application filed December 10, 1877.

*To all whom it may concern:*

Be it known that I, JOHN JOHNSON, of the city of Brooklyn, in the county of Kings and State of New York, have invented certain new and useful Improvements in Compounds for Steam-Packing; and I do hereby declare that the following is a full, clear, and exact description of my invention, which will enable others skilled in the art to which it appertains to make and use the same.

This invention relates to that class of compounds used for steam-packing; and it consists in a composition formed by rubber, bone-black, and sulphur, vulcanized at the required degree of heat.

The ingredients forming my compound are used in about the following proportions: One pound of rubber, four ounces of sulphur, and four ounces of bone-black.

The bone-black used in my compound is finely ground, and, after the rubber and sulphur are well mixed, is added thereto, also mixed with the first two ingredients. The three ingredients being thoroughly mixed, the compound is vulcanized at the required degree of heat, and is then ready for use.

I am aware that a compound composed of sulphur, rubber, and lamp-black has been used; but for steam-packing such compound is of a hard, unyielding nature, and in a short time will, by the action of the steam, become disintegrated, flake off, and is soon rendered useless.

The object of my invention is to produce a substance that will not be injuriously affected by contact with steam, and yet be of a yielding or flexible nature. This I have accomplished by my compound, and disks made from rubber, sulphur, and bone-black act very differently. It forms a flexible substance not affected in any manner by the contact or action of steam. It does not flake or chip off, and will not become disintegrated, but remains intact and unchanged for an indefinite length of time.

Having thus fully described my invention, what I claim as new, and desire to secure by Letters Patent, is—

A compound for steam-packing consisting of rubber, bone-black, and sulphur, in about the quantity named, the same being vulcanized at a required degree of heat, for the purpose specified.

In testimony that I claim the foregoing as my own I have hereto affixed my signature in presence of two witnesses.

JOHN JOHNSON.

Witnesses:
   JOHN P. KINGSFORD,
   ALEX. CAMERON.